(12) United States Patent
Cormier et al.

(10) Patent No.: US 8,417,242 B2
(45) Date of Patent: *Apr. 9, 2013

(54) OPERATOR CONFIGURABLE PREFERRED NETWORK AND RADIO ACCESS TECHNOLOGY SELECTION FOR ROAMING MULTI-RAT CAPABLE DEVICES

(75) Inventors: Jean-Philippe Cormier, Ottawa (CA); Trevor Plestid, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,023

(22) Filed: Jan. 16, 2012

(65) Prior Publication Data

US 2012/0135733 A1    May 31, 2012

Related U.S. Application Data

(63) Continuation of application No. 12/508,748, filed on Jul. 24, 2009, now Pat. No. 8,121,633.

(51) Int. Cl.
*H04W 60/00* (2009.01)

(52) U.S. Cl.
USPC ........ 455/435.1; 455/434; 455/436; 455/515; 370/337; 370/342

(58) Field of Classification Search .................. 455/525, 455/435.2, 435.1, 552.1, 435.3, 438, 434, 455/432.1, 425, 420, 454, 424, 515, 412.1, 455/436, 458, 432, 551, 406, 422.1, 426.1, 455/437; 370/338, 337, 336, 252, 335, 342

See application file for complete search history.

(56) References Cited

U.S. PATENT DOCUMENTS

| | | | |
|---|---|---|---|
| 5,983,115 A | 11/1999 | Mizikovsky | |
| 5,999,811 A | 12/1999 | Molne | |
| 6,119,003 A | 9/2000 | Kukkohovi | |
| 6,148,197 A | 11/2000 | Bridges et al. | |

(Continued)

FOREIGN PATENT DOCUMENTS

| | | |
|---|---|---|
| CA | 2595740 | 2/2008 |
| CA | 2694036 A1 | 8/2010 |

(Continued)

OTHER PUBLICATIONS

"Digital cellular telecommunications system (Phase 2+); Universal Mobile Telecommunications System (UMTS); Service accessibility (3GPP TS 22.011 version 8.4.1 Release 8); ETSI TS 122 011" ETSI Standard, European Telecommunications Standards Institute (ETSI), Sophia Antipolis Cedex, France, vol. 3-SA1, No. V8.4.1, pp. 1-27, Jul. 1, 2008, XP014042047.

(Continued)

*Primary Examiner* — Tan Trinh

(57) ABSTRACT

A multi-RAT capable wireless device and a method for execution in a multi-RAT capable wireless device are provided. The wireless device registers with a data communication service registration point and receives an update to a preferred network,RAT combination list stored at the wireless device, the update having been sent to the wireless device responsive to the wireless device registering with the data communication service registration point. Upon an event triggering network registration, the wireless device selects an available wireless network,RAT combination from a set of available wireless network,RAT combinations having regard to the preferred network,RAT combination list.

20 Claims, 5 Drawing Sheets

U.S. PATENT DOCUMENTS

| | | |
|---|---|---|
| 6,546,246 B1 | 4/2003 | Bridges et al. |
| 6,564,055 B1 | 5/2003 | Hronek |
| 6,934,544 B2 | 8/2005 | Cooper et al. |
| 6,934,558 B1 | 8/2005 | Sainton et al. |
| 6,957,068 B2 | 10/2005 | Hutchison, IV et al. |
| 6,993,336 B2 | 1/2006 | Aerrabotu et al. |
| 7,027,831 B2 | 4/2006 | Aoki et al. |
| 7,047,008 B2 | 5/2006 | Martlew |
| 7,069,026 B2 | 6/2006 | McClure |
| 7,155,219 B2 | 12/2006 | Aerrabotu |
| 7,184,788 B1 | 2/2007 | Hosain et al. |
| 7,333,808 B2 | 2/2008 | Elkarat et al. |
| 7,349,695 B2 | 3/2008 | Oommen et al. |
| 7,389,109 B2 | 6/2008 | Hind et al. |
| 8,121,633 B2 * | 2/2012 | Cormier et al. ............... 455/525 |
| 2003/0134637 A1 * | 7/2003 | Cooper .......................... 455/432 |
| 2005/0059397 A1 | 3/2005 | Zhao |
| 2005/0101323 A1 | 5/2005 | De Beer |
| 2006/0003763 A1 | 1/2006 | Almgren |
| 2006/0094423 A1 | 5/2006 | Sharma et al. |
| 2006/0160538 A1 | 7/2006 | Hwang |
| 2006/0178144 A1 | 8/2006 | Kuroda |
| 2006/0194577 A1 | 8/2006 | Su |
| 2006/0194610 A1 | 8/2006 | Su |
| 2006/0211420 A1 | 9/2006 | Ophir et al. |
| 2006/0217153 A1 | 9/2006 | Coles et al. |
| 2006/0234705 A1 | 10/2006 | Oommen |
| 2006/0252427 A1 | 11/2006 | Bridges et al. |
| 2007/0004405 A1 | 1/2007 | Buckley et al. |
| 2007/0064904 A1 * | 3/2007 | Wesley .................... 379/207.02 |
| 2007/0087745 A1 * | 4/2007 | Poyhonen et al. ......... 455/432.1 |
| 2007/0191006 A1 | 8/2007 | Carpenter |
| 2007/0268877 A1 * | 11/2007 | Buckley et al. ............... 370/338 |
| 2007/0297383 A1 | 12/2007 | Buckley et al. |
| 2008/0057935 A1 * | 3/2008 | Netanel et al. ............. 455/422.1 |
| 2008/0176565 A1 | 7/2008 | Eerolainen et al. |
| 2008/0182615 A1 * | 7/2008 | Xue et al. .................... 455/552.1 |
| 2008/0268843 A1 | 10/2008 | Ore et al. |
| 2009/0180451 A1 * | 7/2009 | Alpert et al. .................. 370/338 |
| 2009/0291686 A1 * | 11/2009 | Alpert et al. .................. 455/436 |
| 2009/0299836 A1 | 12/2009 | Sachs et al. |
| 2010/0075665 A1 * | 3/2010 | Nader et al. ............... 455/426.1 |
| 2010/0142498 A1 * | 6/2010 | Hyounhee .................... 370/337 |
| 2010/0210264 A1 * | 8/2010 | Netanel et al. ............ 455/435.1 |
| 2010/0234042 A1 | 9/2010 | Chan et al. |
| 2010/0304749 A1 * | 12/2010 | Dwyer et al. ................. 455/443 |
| 2011/0070869 A1 | 3/2011 | Ryu |
| 2011/0158117 A1 | 6/2011 | Ho et al. |
| 2012/0214441 A1 * | 8/2012 | Raleigh ........................ 455/406 |

FOREIGN PATENT DOCUMENTS

| | | |
|---|---|---|
| EP | 1509052 | 2/2005 |
| EP | 1679935 | 7/2006 |
| EP | 1885141 A1 | 2/2008 |
| EP | 1921882 | 5/2008 |
| EP | 1937017 | 6/2008 |
| WO | 2005117463 | 12/2005 |
| WO | 2005122601 | 12/2005 |
| WO | 2006109159 | 10/2006 |
| WO | 2007069753 | 6/2007 |
| WO | 2007089821 | 8/2007 |

OTHER PUBLICATIONS

3GPP: "3rd Generation Partnership Project; Technical Specification Group Core Network and Terminals; Characteristics of the Universal Subscriber Identity Module (USIM) application (Release 8)" 3GPP DRAFT; 31102-850, 3rd Generation Partnership Project (3GPP), Mobile Competence Center; 650, Route Des Lucioles; F-06921 Sophia-Antipolis Cedex; France, No. V8.5.0, pp. 1-206, Osaka, Japan; 20090323, Mar. 23, 2009 XP050338721.

* cited by examiner

OPERATOR CONFIGURABLE PREFERRED NETWORK AND RADIO ACCESS TECHNOLOGY SELECTION FOR ROAMING MULTI-RAT CAPABLE DEVICES

RELATED APPLICATION

This application is a continuation of application Ser. No. 12/508,748, which was filed on Jul. 24, 2009, hereby incorporated by reference in its entirety.

FIELD OF THE INVENTION

The present disclosure relates to network selection for multimode or multi-RAT capable devices.

BACKGROUND

Prior to receiving any services from a network operator, a roaming wireless device must select a network from one or more available networks. Multi-RAT (Multi Radio Access Technology) capable wireless devices operating in regions with overlaying Multi-RAT networks pose a further problem for roaming. For example, a Multi-RAT wireless device capable of supporting CDMA (Code Division Multiple Access) and GSM (Global System for Mobile communications) radio access technologies may roam to a region covered by one or more CDMA networks and one or more GSM networks.

It may be that, for example, due to roaming agreements between the operator of the wireless device's home network and the network operator(s) of the available networks in the wireless device's current geographic location, CDMA is the current preferred RAT in the wireless device's current geographic location. However, in another geographic location, for example, in another country, the preferred RAT may be GSM.

Since roaming agreements can change quite dynamically, a hardcoded list stored on a wireless device during production or sale is typically not an ideal solution. Furthermore, since a multi-RAT capable wireless device is capable of operating according to two or more standards respectively associated with the two or more RATs with which it is capable of operating, it is not typically possible to use standard specific mechanisms for optimal roaming.

Many wireless devices are capable of both voice and data communication. However, not all of the networks that are available in the current location of a wireless device may support both voice and data communications. For example, an older legacy network may be available that only supports voice calling, but cannot support data communications, such as e-mail or web browsing.

BRIEF DESCRIPTION OF THE DRAWINGS

Embodiments of the disclosure will now be described in greater detail with reference to the accompanying drawings, in which.

DETAILED DESCRIPTION

Figure 1A:
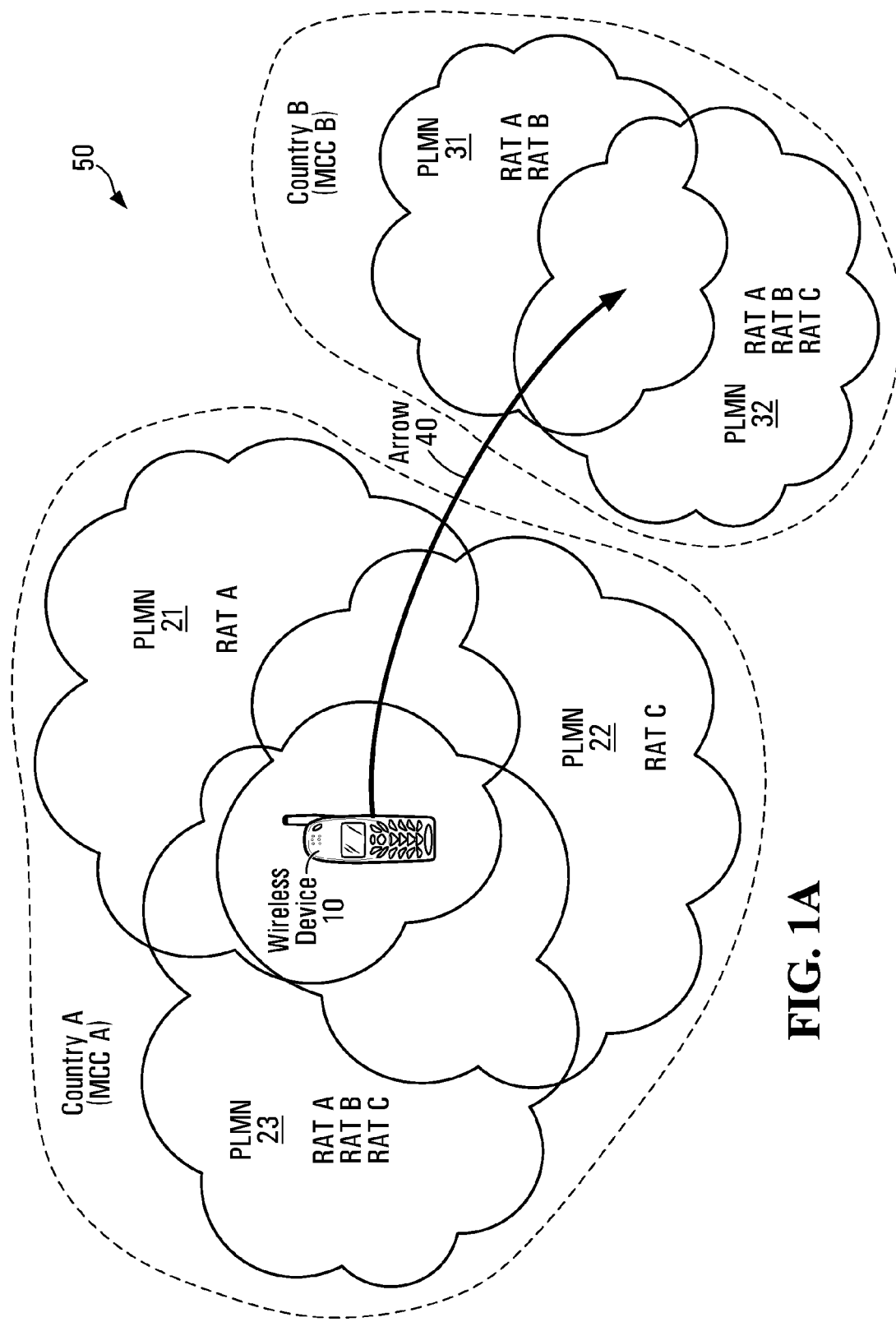
FIG. 1A is a block diagram of a wireless system featuring a multi-RAT capable wireless device and a plurality of wireless networks utilizing various RATs.

According to one broad aspect, there is provided a method for execution in a multi-RAT (multi-Radio Access Technology) capable wireless device, the method comprising: maintaining a registration history of all wireless network,RAT combinations through which the wireless device has previously attempted to register with a data communication service registration point; upon an event triggering network registration, identifying a set of available wireless network,RAT combinations; selecting an available wireless network,RAT combination from the set of available wireless network,RAT combinations having regard to the registration history and a preferred network,RAT combination list stored at the wireless device; attempting to register with the data communication service registration point through the available wireless network,RAT combination that has been selected; if the attempt to register with the data communication service registration point through the available wireless network,RAT combination that has been selected is successful, receiving an update to the preferred network,RAT combination list stored at the wireless device; and updating the preferred network,RAT combination list stored at the wireless device.

In some embodiments, the method further comprises: updating the registration history based on the attempt to register with the data communication service registration point through the available wireless network,RAT combination that has been selected.

In some embodiments, the method further comprises: if the attempt to register with the data communication service registration point through the available wireless network,RAT combination that has been selected is unsuccessful, selecting an available wireless network,RAT combination from the set of available wireless network,RAT combinations having regard to the preferred network,RAT combination list and the updated registration history.

In some embodiments, maintaining a registration history comprises at least one of: maintaining an identification of network,RAT combinations through which the wireless device has previously attempted and failed to register with the data communication service registration point; and maintaining an identification of network,RAT combinations through which the wireless device has previously attempted and succeeded in registering with the data communication service registration point.

In some embodiments: maintaining an identification of network,RAT combinations through which the wireless device has previously attempted and failed to register with the data communication service registration point comprises maintaining a blacklist identifying such network,RAT combinations; and maintaining an identification of network,RAT combinations through which the wireless device has previously attempted and succeeded in registering with the data communication service registration point comprises maintaining a registration list identifying such network,RAT combinations.

In some embodiments, selecting an available wireless network,RAT combination from the set of available wireless network,RAT combinations comprises: avoiding selecting an available wireless network,RAT combination from the set of available wireless network,RAT combinations that is included in the blacklist.

In some embodiments, selecting an available wireless network,RAT combination from the set of available wireless network,RAT combinations comprises: preferentially selecting an available wireless network,RAT combination from the set of available wireless network,RAT combinations that is included in both the preferred network,RAT combination list and the registration list.

In some embodiments, the preferred network,RAT combination list identifies relative preferences for network,RAT combinations identified therein.

In some embodiments, receiving an update to the preferred network,RAT combination list stored at the wireless device comprises: receiving a MCC-dependent (Mobile Country Code-dependent) update to the preferred network,RAT combination list that is dependent on a MCC of the network,RAT combination that has been selected.

In some embodiments, the MCC-dependent update identifies preferred wireless network,RAT combinations having the same MCC as the network,RAT combination that has been selected.

In some embodiments, the MCC-dependent update further identifies preferred wireless network,RAT combinations having a MCC associated with a country that neighbors a country associated with the MCC of the network,RAT combination that has been selected.

In some embodiments, receiving an update to the preferred network,RAT combination list stored at the wireless device comprises: receiving an update generated based on contents of a preferred list repository.

In some embodiments: the update to the preferred network, RAT combination list is included as part of a registration response from the data communication service registration point; and receiving the update comprises receiving the registration response.

In some embodiments: the registration history comprises a record of a last registered network,RAT combination; and selecting an available wireless network,RAT combination from the set of available wireless network,RAT combinations having regard to the registration history and the preferred network,RAT combination list stored at the wireless device comprises selecting the last registered network,RAT combination if the last registered network,RAT combination is included in the set of available wireless network,RAT combinations.

In some embodiments, the preferred network,RAT combination list stored at the wireless device identifies preferred wireless network,RAT combinations by MCC (Mobile Country Code), MNC (Mobile Network Code) and RAT type.

In some embodiments, the preferred network,RAT combination list stored at the wireless device further identifies preferred wireless network,RAT combinations by at least one of Location Area Indicator (LAI) and Routing Area Indicator (RAI).

In some embodiments, the registration history identifies wireless network,RAT combinations by MCC (Mobile Country Code), MNC (Mobile Network Code) and RAT type.

In some embodiments, the update to the preferred network, RAT combination list is dependent on the multi-RAT capability of the wireless device.

In some embodiments, the method further comprises: determining if the updated preferred network,RAT combination list includes an available wireless network,RAT combination that is more preferred than the wireless network,RAT combination that has been selected; and upon determining that the updated preferred network,RAT combination list includes an available wireless network,RAT combination that is more preferred than the wireless network,RAT that has been selected, re-selecting from the set of available wireless network,RAT combinations having regard to the updated preferred network,RAT combination list and the registration history.

According to a second broad aspect, there is provided a computer readable medium having computer executable instructions stored thereon for execution on a wireless device so as to implement the method according to the first aspect described above.

According to a third broad aspect, there is provided a multi-RAT (multi-Radio Access Technology) capable wireless device comprising: at least one antenna; a memory for storing a preferred network,RAT combination list and a registration history of wireless network,RAT combinations through which the wireless device has previously attempted to register with a data communication service registration point; a multi-RAT capable wireless access radio functionally connected to the at least one antenna that, upon an event triggering network registration, identifies available wireless network,RAT combinations; a network,RAT combination selector that: selects an available wireless network,RAT combination from the set of available wireless network,RAT combinations having regard to the registration history and the preferred network,RAT combination list; attempts to register the wireless device with the data communication service registration point through the available wireless network,RAT combination that has been selected; and if the attempt to register with the data communication service registration point through the available wireless network,RAT combination that has been selected is successful: receives an update to the preferred network,RAT combination list; and updates the preferred network,RAT list.

In some embodiments, the network,RAT combination selector updates the registration history based on the attempt to register with the data communication service registration point through the available wireless network,RAT combination that has been selected.

In some embodiments, if the attempt to register with the data communication service registration point through the available wireless network,RAT combination that has been selected is unsuccessful, the network,RAT combination selector selects an available wireless network,RAT combination from the set of available wireless network,RAT combinations having regard to the preferred network,RAT combination list and the updated registration history.

In some embodiments, the registration history comprises at least one of: a blacklist of network,RAT combinations through which the wireless device has previously attempted and failed to register with the data communication service registration point; and a registration list of network,RAT combinations through which the wireless device has previously attempted and succeeded in registering with the data communication service registration point.

In some embodiments, the network,RAT combination selector avoids selecting an available wireless network,RAT combination from the set of available wireless network,RAT combinations that is included in the blacklist.

In some embodiments, the network,RAT combination selector preferentially selects an available wireless network, RAT combination from the set of available wireless network, RAT combinations that is included in both the preferred network,RAT combination list and the registration list.

In some embodiments, the preferred network,RAT combination list identifies relative preferences for network,RAT combinations identified therein.

In some embodiments: the network,RAT combination selector attempts to register with the data communication service registration point by generating a registration request that identifies a MCC (Mobile Country Code) of the wireless network,RAT combination that has been selected.

In some embodiments: the registration history comprises a record of a last registered network,RAT combination; and the network,RAT combination selector is configured to select the last registered network,RAT combination if the last registered network,RAT combination is included in the set of available wireless network,RAT combinations.

In some embodiments, the preferred network,RAT combination list stored at the wireless device identifies preferred wireless network,RAT combinations by MCC (Mobile Country Code), MNC (Mobile Network Code) and RAT type.

In some embodiments, the preferred network,RAT combination list stored at the wireless device further identifies preferred wireless network,RAT combinations by at least one of a Location Area Indicator (LAI) and a Routing Area Indicator (RAI).

In some embodiments, the registration history identifies wireless network,RAT combinations by MCC (Mobile Country Code), MNC (Mobile Network Code) and RAT type.

In some embodiments, the network,RAT combination selector is configured to: determine if the updated preferred network,RAT combination list includes an available wireless network,RAT combination that is more preferred than the wireless network,RAT combination that has been selected; and upon determining that the updated preferred network, RAT combination list includes an available wireless network, RAT combination that is more preferred than the wireless network,RAT that has been selected, re-select from the set of available wireless network,RAT combinations having regard to the preferred network,RAT combination list and the registration history.

Other aspects and features of the present disclosure will become apparent, to those ordinarily skilled in the art, upon review of the following description of the specific embodiments of the disclosure.

In the following detailed description of sample embodiments, reference is made to the accompanying drawings, which form a part hereof, and in which is shown by way of illustration specific sample embodiments in which the present invention may be practised. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

Wireless communication systems may be constructed to operate in accordance with operating specifications determined by a standard-setting regulatory body.

Many operating standards have been developed and continue to be developed and corresponding cellular communication systems have been implemented as these new standards are developed, resulting in a significant portion of the populated area of the world being potentially serviced by one or more generations of wireless communication systems.

Network infrastructures of multiple generations, i.e., RATs, of wireless communication systems might, for example, be installed such that their service areas overlay a common area and can be concurrently operated over the common area. Furthermore, separate networks of the same RAT might be operated concurrently by separate network operators over a common area.

A wireless device may be authorized to communicate using a particular wireless communication system through the purchase of a service subscription with the network operator of the wireless communication system. In cases such as this, the wireless device is usually associated with a home network, which is typically the network that provides coverage over an area in which the user of the wireless device is anticipated most regularly to be operated. However, as wireless devices are inherently mobile, the wireless device might roam beyond the coverage area of its home network. When roaming beyond the home network, the wireless device might instead be positioned at a location encompassed by another network.

Typically, when the wireless device roams beyond its home network, the wireless device is authorized to communicate by way of one or more of the visited networks, depending upon, among other things, whether the wireless device and the visited network operate pursuant to the same RAT. In addition to simply RAT compatibility, agreements between the network operators of the visited and home networks may affect whether or not the wireless device is able to communicate by way of a particular visited network.

The wireless device might roam into an area encompassed by more than one network such that more than one visited network is available to the wireless device. The home network of the wireless device may operate with a first RAT, while a roaming wireless device may encounter networks operating with the same or different RATs while roaming outside the coverage area of its home network. For example, a wireless device may have a service subscription with a North American CDMA wireless communication system, which would mean that its home network is CDMA-based, but while roaming that wireless device might be located in a geographic region that is serviced by both CDMA and GSM networks operated by network operators other than the wireless device's home network operator. In such a situation, if the wireless device is a multi-RAT wireless device capable of communication with CDMA and GSM networks, the wireless device has the potential to select between all of the available CDMA and GSM networks, whereas a wireless device that is only capable of CDMA-based operation would be limited to communicating with the available CDMA network(s).

In general, it may be advantageous for network operators to have some mechanism by which it would be possible to efficiently and dynamically specify a preference for the RAT (radio access technology) and network, i.e. a network,RAT combination, that a roaming wireless device selects to receive services over when roaming.

For a multi-RAT capable wireless device that is capable of both data communication and voice communication, it may be also be preferred that the multi-RAT capable wireless device avoid selecting a wireless network with which to register that is not capable of supporting both voice and data communication.

Conventional mechanisms for selecting between available visited networks while roaming include the use of a preferred roaming list (PRL) for CDMA-based network. The PRL in CDMA-based network selection defines a set of preferred roaming partners, which is typically stored on the Subscriber Identity Module (SIM) of the wireless device, and is used in combination with signal strength scanning to select a preferred roaming partner network from the preferred roaming list with the highest received signal strength.

Historically, the preferred roaming lists are based upon capability of the visited networks having voice capability pursuant to circuit-switched connectivity. However, many late generation wireless communication systems and wireless devices are capable of packet-switched communication services. This means that many new networks operating with newer RATs, such as CDMA and Global Packet Radio Service (GPRS), provide access to packet data services while some older legacy networks provide only circuit-switched services.

When packet data communication services are to be used by a roaming mobile node, selection of the visited network through which to communicate based upon conventional criteria, i.e., based upon merely the capability of a visited network to handle voice communications, is inadequate to ensure that a packet data communication service can be provided in the selected network. Furthermore, even if the selection of the visited network is limited to selection from those visited networks that are potentially capable of supporting a packet data communication service, it may be advantageous to avoid selecting a visited network that has previously been found to be unable to provide the desired service, even though it should have been capable of doing so based on its RAT capabilities.

When roaming, before a wireless device is able to make and receive voice calls and/or send and receive data over a visited network, the cellular wireless device selects and registers with one of a plurality of communication networks which are available within a given geographic coverage area. After registering with the selected network, the wireless device typically monitors a wireless communication channel of the selected network to monitor for its calls or messages.

Communication System

Referring first to FIG. 1A, shown is a block diagram of a wireless system 50 featuring a multi-RAT capable wireless device 10 and a plurality of wireless networks 21,22,23,31, 32. Wireless networks 21, 22 and 23 provide partially overlapping service coverage in a first country A associated with a first MCC (mobile country code) A, while wireless networks 31 and 32 provide partially overlapping service coverage in a second country B associated with a second MCC B. For illustrative purposes, it is assumed that the multi-RAT wireless device 10 is capable of operating with three RATs, namely RAT A, RAT B and RAT C. RATs A and B, may, for example, be 2G GSM and 3G UMTS and RAT C may be CDMA.

In the illustrated example, it is assumed that each of the wireless networks 21, 22, 23, 31 and 31 is a PLMN (Public Land Mobile Network). It is further assumed that: wireless network 21 operates using RAT A, e.g. 2G GSM; wireless network 22 operates using RAT C, e.g. CDMA; wireless network 31 operates using RATs A and B, e.g. 2G and/or 3G GSM, and wireless networks 23 and 32 operate using RAT A, RAT B and RAT C. However, more generally, each of the wireless networks 21, 22, 23, 31 and 32 may be any appropriate wireless network operating with any number of RATs, provided that each available network connection can be uniquely identified during registration. Examples of potential wireless networks in conjunction with which embodiments of the present disclosure might be used include, but are not limited to, GSM/Edge Radio Access Network (GERANs), Universal Mobile Telecommunications System Terrestrial Radio Access Network (UTRANs), Evolved UMTS Terrestrial Radio Access Network (EUTRANs), Code Division Multiple Access 2000 (CDMA2000) Networks, Wireless Local Area Networks (WLANs) or Wireless Fidelity (WiFi) Networks, and Worldwide Interoperability for Microwave Access (WiMAX) Networks.

PLMN's are typically identified by a MCC (Mobile Country Code) and a MNC (Mobile Network Code). However, with reference to the illustrated example, in order to uniquely identify the potential network,RAT combinations available via wireless networks 23, 31 and 32, which are multi-RAT networks, a RAT identifier may be used in addition to the MCC and MNC of wireless networks 23, 31 and 32 in order to distinguish between the available network,RAT combinations.

For the purposes of this disclosure, it is assumed that the multi-RAT capable wireless device 10 is to be used to provide access to one or more data communication services. In general, a data communication service is any service that provides communication of data to and from a wireless device over an available wireless network capable of providing said service. Often, this communication of data takes the form of packet data transmissions to and from the wireless device. However, it should be understood that this disclosure is not limited to packet-based data communication services.

The data communicated service may be, for example, an e-mail service for communicating e-mail messages to and from the wireless device 10. For some data communication services, the wireless device 10 must register with a communication data service registration point, which may be associated with the home network of the wireless device, each time the wireless device registers with a new network in order to receive proper HRT (Host Routing Table) information for the communication data service. This communication data service registration point may function as a data relay through which data associated with the particular communication data service is relayed to the wireless device 10.

Figure 1B:
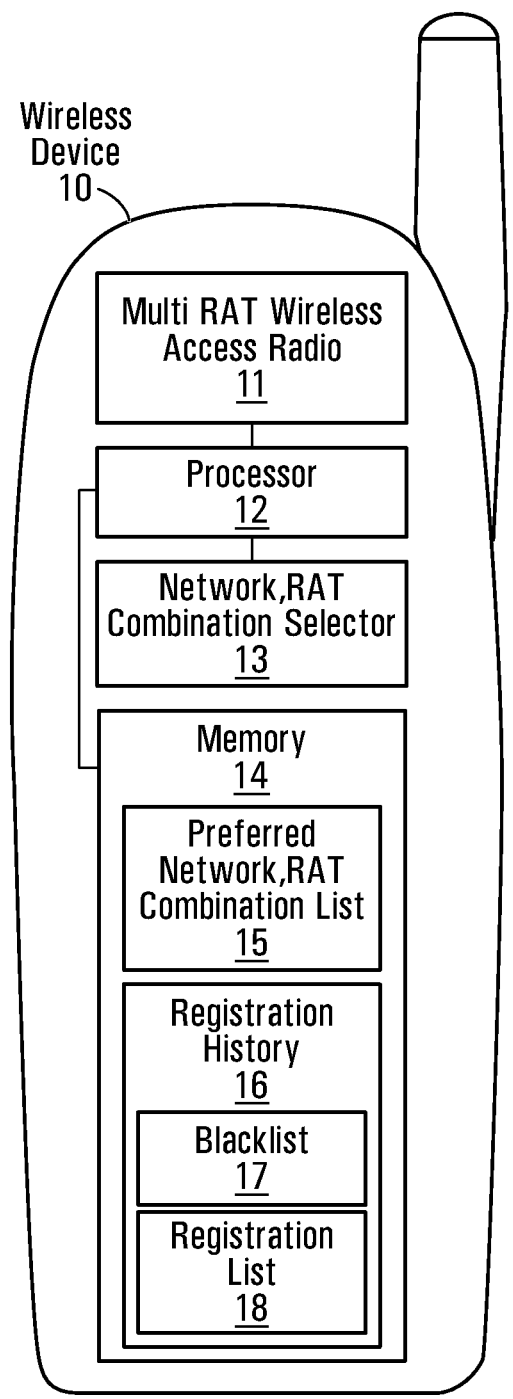
FIG. 1B is a block diagram of the wireless device shown in FIG. 1A.
Figure 2:
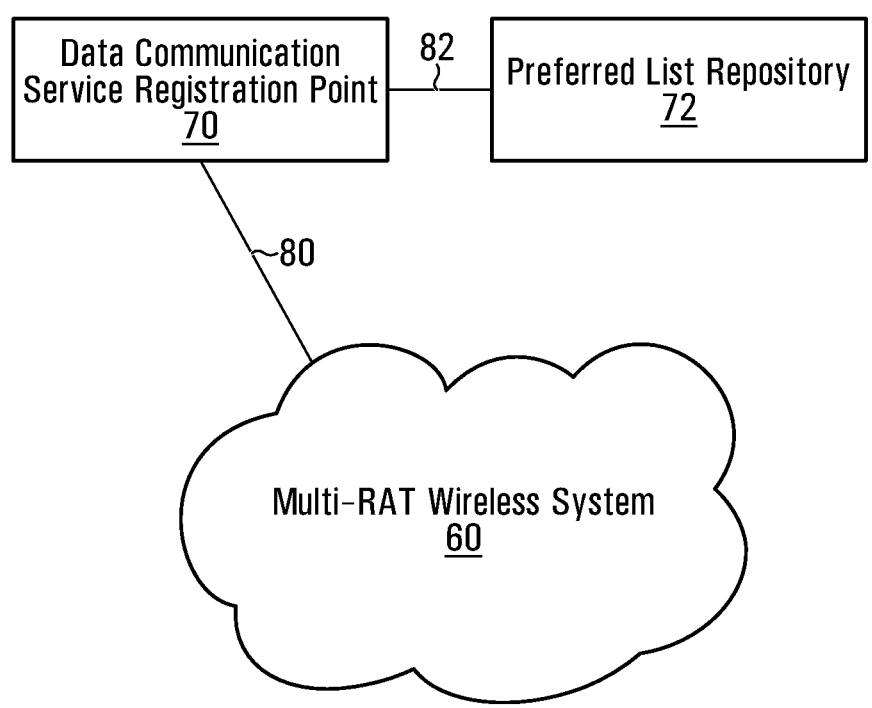
FIG. 2 is a block diagram of a multi-RAT wireless system interfaced with a data communication service registration point.

Referring to FIG. 2, shown is a block diagram of an arrangement of a multi-RAT wireless system 60 in communication with a data communication service registration point 70 via a communication link 80. The data communication service registration point 70 is in turn in communication with a preferred list repository 72 via a communication link 82. Preferred list repository 72 may be co-located with or integrated with the data service communication registration point 70. The multi-RAT wireless system 60 represents any number of wireless networks from one or multiple operators providing communications through any number of RATs. That is, the multi-RAT wireless system 60 may include any number of network,RAT combinations through which a wireless device, such as the wireless device 10 shown in FIGS. 1A and 1B (described below), may potentially attempt to register with the data communication service registration point 70 to receive the data communication service.

The preferred list repository 72 contains one or more lists defining preferred network,RAT combinations on a per MCC-basis or on a per region basis, where a region typically encompasses geographical locations from multiple countries, i.e., multi-MCC. For one or more of the MCCs or regions there may be a separate list for different classifications of subscribers. For example, a network operator may sell a "World Roamer" subscription plan and an "Economy" subscription plan and may wish to provide a different preferred network,RAT combination list to those different types of subscribers in one or more MCCs or regions.

In some embodiments, the preferred list repository 72 includes a hierarchy of lists, with a "master" list that identifies the preferred network,RAT combination list that is to be used in each MCC or region for different subscriber types. Table 1 provides an example of how a section of such a "master" list for MCC 310 might be represented.

TABLE 1

| Subscriber Type | MCC | Preferred List Identifier |
| --- | --- | --- |
| World Roamer Subscriber | 310 | List_1 |
| Economy Subscriber | 310 | List_2 |

As can be seen from the section of the exemplary "master" list in Table 1, subscribers of the "World Roamer" type would receive preferred Network,RAT combination list "List_1" when successfully registered with the data communication service registration point 70 through a network,RAT combination associated with MCC 310.

In some embodiments, the preferred list repository 72 may store a "global" list for each network operator identifying the network operator's roaming partners in all known MCCs in which the network operator has at least one roaming partner. However, "Global" updates, i.e., transmitting the entire "global" is likely to require more bandwidth than MCC-dependent or region-dependent updates, i.e., transmitting the preferred network,RAT combinations associated with a particular MCC or region.

Typically, a registration response is sent to a wireless device from the data communication service registration point 70 in response to the wireless device's registration with the data communication service registration point each time the wireless device registers with a new network,RAT combination within the multi-RAT wireless system 60. In some embodiments, this registration response includes a list of preferred network,RAT combinations for the wireless device to use while roaming.

The list of preferred network,RAT combinations may be retrieved from the preferred list repository 72 for inclusion as part of the registration response from the data communication service registration point 70 to the wireless device.

The preferred network,RAT combination list from the communication data service registration point 70 is used to update a preferred network,RAT combination list stored at the wireless device, which the wireless device uses as part of its network,RAT combination selection process. In this way, any updates to the preferred network,RAT combination list are propagated to the wireless devices each time they register with the data communication service registration point associated with their respective home networks in order to receive the data communication service.

In some embodiments, the preferred network,RAT combination list is not included in a registration response from the data communication service registration point 70, rather another wireless communication element (not shown) that is in communication with the preferred list repository 72 and the data communication service registration point 70 may retrieve the preferred network,RAT list from the preferred list repository 72 and transmit it to the wireless device once the data communication service registration point 70 notifies the wireless communication element that the wireless device successfully registered with the data communication service registration point. In such embodiments, the data communication service registration point 70 may not be in communication with the preferred list repository 72.

In addition to the updating of the preferred network,RAT combination list provided by the network operator of a wireless device's home network, this disclosure also utilizes the concept of selecting an available network,RAT combination based on the success and/or failure of previous attempts to register with the data communication service registration point through the available networks. To this end, a wireless device in accordance with the disclosure maintains a registration history of attempts to register the wireless device with the data communication service registration point. The registration history may include an identification of network, RAT combinations through which the wireless device has attempted and failed to register with the data communication service registration point and/or an identification of network, RAT combinations through which the wireless device has succeeded in registering with the data communication service registration point.

The identification of network,RAT combinations through which registration has failed may be implemented as a blacklist that identifies said network,RAT combinations through which the wireless device has attempted and failed to register with the data communication service registration point, while the identification of network,RAT combinations through which registration has succeeded may be implemented as a registration list that identifies said network,RAT combinations through which the wireless device has successfully registered with the data communication service registration point. Only the results of the most recent attempt to register with the data communication service registration point is included in the registration history for any given network, RAT combination. For example, if a previous attempt to register with the data communication service registration point through a given network,RAT combination was successful, then that success would be noted by identifying the given network,RAT combination in the registration list to indicate that the wireless device had successfully registered with the data communication service registration point through the given network,RAT combination. However, if a subsequent attempt to register with the data communication service registration point through the same network,RAT combination failed, the failure would be noted by adding an identification of the network,RAT combination to the blacklist and the inclusion of the network,RAT combination in the registration list would be removed. Correspondingly, removal of a network,RAT combination from the blacklist and addition to the registration list may be performed if a first attempt to register with the data communication service registration point through the network,RAT combination fails but a later attempt succeeds.

The registration history may be persisted at the wireless device for at least the duration in which the wireless device is located within a geographic region associated with a current MCC. In other words, in some embodiments, while roaming in a country other than that in which a wireless device's home network is located, the wireless device may maintain a history of successes/failures to connect to the data communication service through the available networks in the roaming country and base its network,RAT combination selection at least in part on this history, such that the wireless device avoids attempting to connect to networks through which it has previously failed to connect to the data communication service. This history of successes/failures may be realized by maintaining a "blacklist" of networks/RATs over which the wireless device has attempted and failed to connect to a data communication service and a separate list of networks/RATs over which the wireless device has attempted and succeeded to connect to the data communication service.

In some embodiments, the blacklist is network,RAT combination-specific, which means that it identifies not only the network, typically using MCC and MNC, but also a RAT identifier to uniquely identify the network,RAT combination over which the failed attempt to register with the communication data service registration point was made. For example, with reference to FIG. 1A, if the wireless device 10 attempts and fails to register with a data communication service registration point using RAT B over wireless network 23, in some embodiments, the wireless device 10 would then add an entry to its blacklist identifying RAT B (via a RAT identifier corresponding to RAT B) of wireless network 23 (via MCC and MNC of wireless network 23).

Example details of the wireless device 10 are shown in FIG. 1B. The wireless device 10 has a multi-RAT wireless access radio 11, a processor 12, a network,RAT combination selector 13 and a memory 14. The wireless system 50 and the wireless device 10 may have other components, but they are not shown for sake of simplicity. In some embodiments the memory 14 may include a SIM (Subscriber Identity Module).

Operation of the wireless device 10 will now be described first by way of detailed example with reference to FIGS. 1A, 1B and 2. Following this, flow charts of example functionality of the wireless device 10 will be described.

The memory 14 is used to store lists of network,RAT combinations, which are used in network,RAT combination selection. The lists of network,RAT combinations include a registration history 16 and a preferred network,RAT combination list 15. The preferred network,RAT combination list 15 is provided and updated OTA (Over The Air) following registration with a data communication service registration point as described herein.

In the illustrated example, the registration history 16 includes a blacklist 17 of network,RAT combinations through which the wireless device 10 has previously attempted and failed to register with a data communication service registration point, and a registration list 18 of network,RAT combinations through which the wireless device has previously succeeded in registering with a data communication service registration point. The blacklist 17 and the registration list 18 are maintained and updated in the memory 14 by the processor 12.

The network,RAT combination selector 13 of the wireless device 10 performs network,RAT combination selection of a network,RAT combination from a set of available network, RAT combinations based on the preferred network,RAT combination list and the registration history 16. In general, in order to select a candidate network,RAT combination from a set of available network,RAT combinations that have been identified, the network,RAT combination selector 13 utilizes the preferred network,RAT combination list 15 to determine which, if any, of the available network,RAT combinations are preferred, and their level of preference relative to one another.

In some embodiments, the set of available network,RAT combinations is determined using the multi-RAT wireless access radio 11 to determine received signal strength indicators (RSSIs) of network,RAT combinations operating in the current geographical location of the wireless device 10.

The network,RAT combination selector 13 utilizes the registration history 16 to potentially improve the likelihood of selecting a network,RAT combination through which the wireless device 10 will be able to register with a data communication service registration point. For example, if the registration history 16 includes the blacklist 17 of network, RAT combinations through which the wireless device 10 has previously attempted and failed to receive data service, the network,RAT combination selector 13 may avoid selecting any available network,RAT combination that is included in the blacklist 17. Similarly, if the registration history 16 includes the registration list 18 of network,RAT combinations through which the wireless device 10 has previously succeeded in receiving data service, the network,RAT combination selector 13 may preferentially select an available network,RAT combination that is included in both the preferred network,RAT combination list 15 and the registration list 18.

In order to receive data communication service, the wireless device 10 must connect to the wireless communication service through an available network capable of providing access to the data communication service in the wireless device's current geographical location.

While operating in regions in which the home network of the wireless device 10 provides access to the communication data service, the network operator of the wireless device's home network typically prefers that the wireless device registers with and receives services through the home network. However, in regions in which the home network of the wireless device 10 is unable to provide coverage, for example, when the wireless device is roaming, it is generally preferred that the wireless device registers with, and receives access to the data communication service through, a visited network operated by a network operator with which the network operator of the wireless device's home network has a preferred roaming agreement.

The preferred roaming agreement between the home network operator and the visited network operator can potentially reduce the costs associated with receiving services through the visited network for the wireless device's user. However, as noted above, roaming agreements between network operators can change often and therefore a static preferred network,RAT combination list could potentially lead to network,RAT combination selection that results in the selection of a visited network with a roaming agreement that is currently less preferred than another available visited network due to changing roaming agreements that are not reflected in the static preferred list. Accordingly, embodiments of the present disclosure include OTA updating of a preferred network,RAT combination list when a wireless device, such as the wireless device 10 shown in FIGS. 1A and 1B, registers with a data communication service registration point in order to receive the data communication service.

With reference to FIG. 2, the wireless device 10 re-registers with the data communication service registration point 70 to receive the data communication service each time the wireless device registers with a new network,RAT combination. A network operator may submit changes to the preferred network,RAT combination lists that are stored in the preferred list repository 72 for the wireless devices with subscription services to the operator's network. The changes to the preferred network,RAT combination list for a wireless device, which may have been submitted by the wireless device's home network operator due to changes in one or more roaming agreements, are then propagated to the wireless device when the wireless device next registers with the data communication service registration point 70. A network operator may update the preferred list repository 72 by interfacing with it through the data communication service registration point 70 or some other interface device (not shown) in order to update the preferred network,RAT combination list(s) stored in the preferred list repository. For example, with reference to Table 1, a network operator associated with the section of the "master" list shown in Table 1 could potentially change the preferred network,RAT combination list for "Word Roamer" subscribers for MCC 310 by either changing "List_1" or by changing the list that is pointed to for "World Roamer" subscribers for MCC 310, e.g., the "List_1" entry could be replaced with an entry that points to "List_1_NEW".

In some embodiments, the multi-RAT capabilities of the mobile device 10 may be taken into consideration during updating of the preferred Network,RAT combination list stored on the wireless device 10. For example, in some embodiments, prior to the OTA transmission of the preferred network,RAT combination list to the wireless device 10, the list may be edited to remove non-applicable RATs. That is, network,RAT combinations that are not supported by the wireless device 10 may be removed from the preferred network,RAT list prior to transmission. Alternatively, preferred network,RAT combination lists that are specific to different permutations and combinations of RAT capabilities may be stored in the preferred list repository, rather than dynamically editing a common preferred network,RAT list prior to transmission of the list.

In some embodiments, a common list is transmitted to each wireless device, and the wireless device 10 is configured to ignore networks operating with RATs that it cannot support.

In some embodiments, when registering with the data communication service registration point, the wireless device 10 identifies the MCC associated with the network,RAT combination through which the wireless device 10 is attempting to register with the data communication service registration point as part of its registration attempt, which allows an MCC-dependent update of the preferred network,RAT combination list to be provided to the wireless device 10 OTA via the data communication service, for example, from the data communication service registration point 70 via communication link 80 for the embodiment shown in FIG. 2. That is, in some embodiments, an updated preferred network,RAT combination list is provided to the wireless device 10 based on the MCC of the network,RAT combination through which the wireless device 10 registers with the data communication service registration point 70 to receive the data communication service.

In some embodiments, the update to the preferred network, RAT combination list may only include preferred network, RAT combinations having the same MCC as that associated with the network,RAT combination through which the wireless device 10 has registered with the data communication service registration point 70.

In some embodiments, the updated preferred network,RAT combination list may also include network,RAT combinations having MCCs associated with countries that neighbour the country in which the network,RAT combination through which the wireless device 10 has registered with the data communication service registration point 70 is located.

The foregoing two approaches can potentially reduce the amount of data that must be communicated OTA to the wireless device 10 in order to update the preferred network,RAT combination list stored thereon. In some embodiments, if bandwidth concerns are not an issue, updates for all potential roaming regions could be provided to the wireless device 10 when the wireless device 10 connects to the data communication service.

For illustrative purposes, it is assumed that countries A and B are not the home country of the wireless device 10 and that the wireless networks 21, 22, 23, 31 and 32 are not the home network of the wireless device. It is also assumed that RAT A is a circuit switched (CS) RAT capable of providing voice service, e.g. 2G GSM, RAT B is a packet switched (PS) RAT capable of providing data service, e.g. 3G GSM/UMTS, RAT C is capable of providing both voice and data service, e.g. CDMA, and the multi-RAT wireless access radio 11 of the multi-RAT wireless device 10 is capable of communicating via RAT A, RAT B and RAT C.

In the illustrated example, it is further assumed that the network operator of the home network of the wireless device 10 has roaming agreements with the operators of wireless networks 22, 23 and 32. However, it is further assumed that the preference for network 32 in country B has occurred subsequent to the wireless device's last registration with a data communication service registration point, and as such the preferred network,RAT combination list 15 stored in the memory 14 of the wireless device initially identifies the relative preference for networks 22 and 23. Table 2 provides an example of a portion of such a preferred network,RAT combination list.

TABLE 2

Preferred Network, RAT Combination List

| Preference | MCC | MNC | Preferred RAT |
|---|---|---|---|
| 1 | MCC A | PLMN 23 | RAT B |
| 2 | MCC A | PLMN 23 | RAT C |
| 3 | MCC A | PLMN 22 | RAT C |

It should be noted that the preferred network list stored in the memory 14 of the wireless device 10 includes at least the following fields:

Preference/Priority (ordering);
MCC;
MNC; and
Preferred RAT.

The MCC and MNC identify a PLMN, but the inclusion of the Preferred RAT field indicates the RAT that is preferred for a multi-RAT PLMN.

The preferred network,RAT combination list shown in Table 2 may have been transmitted to the wireless device 10 the last time the wireless device registered with a data communication service registration point, in accordance with the present disclosure.

When the wireless device 10 is powered on, or when the wireless device 10 loses coverage, the wireless device 10 will attempt to register with an available network. In the illustrated example, it is assumed that the wireless device 10 is powered on by its user after moving to its current location in country A from a position outside the coverage area of the PLMNs 21, 22, 23. Once powered on, the wireless device 10 identifies available wireless network,RAT combinations and finds that there are three available wireless networks in its present area, namely PLMNs 21, 22, and 23, offering five wireless network,RAT combinations, namely PLMN 23,RAT A, PLMN 23,RAT B, PLMN 23,RAT C, PLMN 21,RAT A and PLMN 22,RAT C.

In some embodiments, the registration history 16 includes a record of the last network,RAT combination that the wireless device 10 was registered with. This record may, for example, be included in the registration list 18. In such embodiments, the network,RAT combination selector 13 may check the registration history 16 in the memory 14 to determine if the wireless device 10 was last registered to any of the available wireless network,RAT combinations. As noted above, for the purposes of this example it has been assumed that the wireless device 10 has been powered on by its user after moving to its current location in country A from a position outside the coverage area of the PLMNs 21,22,23. As such, it is assumed that the wireless device 10 was last operated outside of the coverage area of the PLMNs 21,22,23 and therefore the wireless device 10 was not last registered with any of the network,RAT combinations that have been identified as currently available to the wireless device 10. This could be determined by the network,RAT combination selector 13 by comparing a record in the registration history 16 of the last network,RAT combination that the wireless device was registered with to the set of available network,RAT combinations that have been identified for its current location in country A.

In some embodiments, once the network,RAT combination selector 13 determines that the last registered network,RAT combination is not currently available, the network,RAT combination selector 13 selects one of the available network, RAT combinations having regard to the preferred network, RAT combination list 15 and the registration history 16 stored in the memory 14 of the wireless device 10.

For the purposes of this example, it is assumed that the wireless device 10 has not blacklisted any of the available network,RAT combinations available in its current location in country A. That is, the blacklist 17 that is part of the registration history 16 stored in the memory 14 of the wireless device 10 does not identify any of the currently available network, RAT combinations as being blacklisted. For illustrative purposes, Table 3 provides an example of an empty blacklist.

TABLE 3

| Blacklist | | |
|---|---|---|
| MCC | MNC | RAT |

In some embodiments, in order to determine if an available network,RAT combination is blacklisted, the network,RAT combination selector 13 determines if the available network, RAT combination is listed in the blacklist 17. Since the example blacklist shown in Table 3 is empty, i.e., does not identify any of the available network,RAT combinations, the network,RAT combination selector 13 determines that none of the available network,RAT combinations are blacklisted. In some embodiments, the network,RAT selector 13 avoids attempting to register with an available network,RAT combination that has been blacklisted.

In some embodiments, the registration history 16 stored in the memory 14 of the wireless device 10 also includes a registration list 18, which is used to maintain a history of network,RAT combinations through which the wireless device has successfully registered with a data communication service registration point.

For the purposes of this example, it is assumed that the registration list 18 is initially empty, and therefore does not identify any of the available network,RAT combinations. Table 4 provides an example of an empty registration list in accordance with an embodiment of this disclosure.

TABLE 4

| Registration List | | |
|---|---|---|
| MCC | MNC | RAT |

Having regard to the preferred network,RAT combination list 15, which is assumed to include the preferences identified in Table 2, and the registration history 16, which is assumed to include an empty blacklist 17, such as the blacklist shown in Table 3, and an empty registration list 18, such as the registration list shown in Table 4, the network,RAT combination selector 13 determines that RAT B of PLMN 23 is the preferred network,RAT combination to register with in its current location.

Once the network,RAT combination selector 13 has selected network,RAT combination PLMN 23,RAT B as described above, the wireless device 10 attempts to register with a data communication service registration point, such as the data communication service registration point 70 shown in FIG. 2, through the network,RAT combination (PLMN 23, RAT B) that has been selected.

If the wireless device 10 succeeds in registering with the data communication service registration point through RAT B of PLMN 23, the wireless device receives an OTA update to its preferred network,RAT combination list 15.

In some embodiments, the update to the preferred network, RAT combination list is provided by the data communication service registration point, which may retrieve the update from a preferred list repository, such as the preferred list repository 72 shown in FIG. 2.

In some embodiments, the update to the preferred network, RAT combination list 15 is based on the MCC of the network through which the wireless device 10 is currently registered, which in this case would be MCC A of PLMN 23.

If the attempt to register with the data communication service registration point 70 through PLMN 23,RAT B is successful, the wireless device 10 may update the registration list 18 with an entry indicating that the wireless device 10 successfully registered with the data communication service registration point 70 through RAT B of PLMN 23.

In some embodiments, an updated preferred network,RAT combination list may not be provided by the preferred list repository 72 if the wireless device 10 already has an up-to-date preferred network,RAT combination list. This may be achieved, for example, by having a "version" number associated with each preferred network,RAT combination list update and by only providing the update if a newer version than that currently stored at the wireless device 10 is available. The wireless device 10 could identify the "version" number of its current preferred network,RAT list as part of its registration with the data communication service registration point 70. Alternatively, the data communication service point 70 could maintain a record of what the last update was that was transmitted to the wireless device 10 and would only transmit a further update to the wireless device 10 when one becomes available.

In some embodiments the update to the preferred network, RAT combination list may be entries that are appended to the preferred network,RAT combination list stored at the wireless device 10 and/or may overwrite some but not all of the entries in the preferred network,RAT combination list stored at the wireless device 10.

In some embodiments, the update to the preferred network, RAT combination list includes a replacement network,RAT combination list that completely overwrites the preferred network,RAT combination list that is stored at the wireless device 10. This latter method can potentially keep the preferred network,RAT combination that is stored at the wireless device 10 small.

Table 5 provides an example of an updated version of the registration list shown in Table 4, which has been updated to identify a successful registration with the data communication service registration point through PLMN 23,RAT B.

TABLE 5

| Registration List | | |
|---|---|---|
| MCC | MNC | RAT |
| MCC A | PLMN 23 | RAT B |

Alternatively, if the wireless device 10 fails to register with the communication data service registration point 70 through the network,RAT combination that has been selected (PLMN 23,RAT B), the wireless device may blacklist RAT B of PLMN 23 by updating the blacklist 17 stored in memory 14 with an entry including the MCC, MNC and RAT identifier corresponding to RAT B of PLMN 23. Table 6 provides an example of how the blacklist shown in Table 3 may be updated to identify RAT B of PLMN 23 if the attempt to register with the data communication service registration point through RAT B of PLMN 23 is unsuccessful.

TABLE 6

| Blacklist | | |
|---|---|---|
| MCC | MNC | RAT |
| MCC A | PLMN 23 | RAT B |

The registration list 18 and the blacklist 17 may be maintained in the memory 14 indefinitely, or may only be maintained until the wireless device 10 registers in a new location with a different MCC.

In some embodiments, the blacklist 17 is cleared after every preferred network,RAT combination list 15 update.

In some embodiments, the wireless device 10 is configured to display the preferred network,RAT combination list 15 to a user of the device to allow manual user selection of a preferred network,RAT combination from the list.

In some embodiments, the wireless device 10 is configured to allow a user of the device to manually clear the blacklist 17.

Assuming that the wireless device 10 has succeeded in connecting to the data communication service through RAT B of PLMN 23 and has received an MCC-dependent update to its preferred network,RAT combination list 15, in some embodiments the wireless device 10 then checks to see if the updated preferred network list indicates that one of the other available networks, namely PLMNs 21 or 22, is now more preferred (according to the updated preferred network list 15) than RAT B of PLMN 23.

Table 7A provides an example of the preferred network, RAT combination list shown in Table 2 after an update is received that indicates PLMN 22,RAT C is now more preferred than PLMN 23,RAT B or PLMN 23,RAT C.

TABLE 7A

| Preferred Network, RAT Combination List | | | |
|---|---|---|---|
| Preference | MCC | MNC | Preferred RAT |
| 1 | MCC A | PLMN 22 | RAT C |
| 2 | MCC A | PLMN 23 | RAT B |
| 3 | MCC A | PLMN 23 | RAT C |

This change in preferred network may have resulted, for example, from a change in the roaming agreements between the operator of the wireless device's home network and the operators of one or more of the available networks PLMNs 21, 22, 23. In the illustrated example, it has been assumed that RAT A does not support data communication, and therefore the wireless device cannot register with the data communication service registration point through either PLMN 23, RAT A or PLMN 21, RAT A. It should be noted that the preferred network,RAT combination list 15 does not contain either of those network,RAT combinations, as they are incapable of supporting data communication. However, in some embodiments, the preferred network,RAT combination list 15 may include those network,RAT combinations as the least preferred network,RAT combinations, although omitting them can potentially reduce the size of the OTA transmission of the update to the preferred network,RAT combination list 15.

In some embodiments, the preferred network,RAT combination list 15 updates may include updates for a region that includes more than one country. For example, when the wireless device 10 registers with the data communication service registration point 70 through a network,RAT combination in a first country, it may receive an updated preferred network, RAT combination list that includes preferences for the first country as well as one or more neighbouring countries that are part of the same region as the first country. For example, a region may be defined that includes Germany and France, such that when the wireless device 10 registers in either Germany or France the wireless device 10 is provided with a list of the preferred network,RAT combinations for both Germany and France. With reference to the specific example discussed above with reference to FIG. 1A, in some embodiments a region that includes both Country A and Country B might be defined, such that when the wireless device 10 receives an update to its preferred network,RAT combination list 15 while operating in Country A, the update includes preferred network,RAT combinations for both Country A and Country B.

Table 7B provides an example of the preferred network, RAT combination list shown in Table 2 after an update is received that indicates PLMN 22,RAT C is now more preferred than PLMN 23,RAT B or PLMN 23,RAT C in Country A and PLMN 32,RAT C is preferred over PLMN 32,RAT B in Country B.

TABLE 7B

| Preferred Network, RAT Combination List | | | |
|---|---|---|---|
| Preference | MCC | MNC | Preferred RAT |
| 1 | MCC A | PLMN 22 | RAT C |
| 2 | MCC A | PLMN 23 | RAT B |
| 3 | MCC A | PLMN 23 | RAT C |
| 1 | MCC B | PLMN 32 | RAT C |
| 2 | MCC B | PLMN 32 | RAT B |

Region-based updates can potentially be beneficial, as the wireless device can be made aware of changes to network, RAT combination preferences in neighbouring countries before actually attempting to operate in one of the neighbouring countries.

Assuming that the preferred network,RAT combination list 15 has been updated as shown in Table 7A and now indicates that RAT C of PLMN 22 is more preferred than RAT B of PLMN 23, in some embodiments, the network,RAT combination selector 13 will attempt to register with PLMN 22 using RAT C, and if successful will then attempt to re-register with the data communication service registration point through PLMN 22,RAT C. Alternatively, the wireless device 10 may remain registered with PLMN 23,RAT B until it is powered down or RAT B of PLMN is incapable of providing the data communication service, for example, if the wireless device 10 moves out of the coverage region of PLMN 23.

If the attempt to re-register with the data communication service registration point through PLMN 22,RAT C is successful, then the wireless device may update the registration list 18 to include an identification of the successful registration through PLMN 22,RAT C. Table 8 is an example of how the registration list shown in Table 5 may be updated after a successful registration with the data communication service registration point through PLMN 22,RAT C.

TABLE 8

| Registration List | | |
|---|---|---|
| MCC | MNC | RAT |
| MCC A | PLMN 22 | RAT C |
| MCC A | PLMN 23 | RAT B |

In situations where the preferred network,RAT combination list 15 stored in the memory 14 does not indicate a preference for one of the available networks, the network, RAT combination selector 13 might initially select one of the available network,RAT combinations based on some suitable criterion, for example RSSI (Received Signal Strength Indication). Such a situation may arise, for example, when the wireless device 10 is first turned on in a new coverage region associated with an MCC for which the wireless device 10 has not yet received an update to its preferred network,RAT combination list 15, or in situations where network,RAT combinations are equally preferred, e.g. equal preference ranking, in the preferred network list. In some cases, a network operator may wish to substantially balance their roaming subscribers between equally preferred network,RAT combinations. For embodiments in which preference is indicated by the ordering of the preferred network,RAT combination list, which prevents equal ranking, a separate list may be provided for each of the equally preferred network,RAT combinations that respectively list one of the equally preferred network, RAT combinations as the most preferred. In some embodiments, each separate list has a respective one of the equally preferred network,RAT combinations ordered first in its list of preferred network,RAT combinations. In some embodiments, these separate lists may be equally distributed amongst subscribers, so that a substantially equal number of subscribers receive each respective list.

Subsequent to registering with one of the PLMNs 22, 23, as described above, it is assumed that the wireless device 10 is moved to another geographical region located in country B (associated with MCC B) as indicated by arrow 40. The movement causes the wireless device 10 to lose coverage and therefore another registration is triggered. The wireless device 10 identifies available wireless network,RAT combinations in its new location in country B and finds that there are two available wireless networks in its new area, namely PLMNs 31 and 32 offering five available network,RAT combinations, namely PLMN 31,RAT A, PLMN 31,RAT B, PLMN 32,RAT A, PLMN 32,RAT B and PLMN 32,RAT C.

For illustrative purposes, it is assumed that prior to moving to country B, the wireless device 10, while operated in country A, first attempted and succeeded in registering with a data communication service registration point through PLMN 23,RAT B, at which point the wireless device received an update to its preferred network,RAT combination list and based on that update re-registered with the data communication service registration point through PLMN 22,RAT C as described above. That is, for the purposes of this example it is assumed that when the wireless device 10 is moved from country A to country B the preferred network,RAT combination list 15, blacklist 17 and registration list 18 stored in the memory 14 of the wireless device are as shown in Tables 7A, 3 and 8, respectively.

In some embodiments, the network,RAT combination selector 13 determines if the wireless device 10 was last registered to any of the available wireless network,RAT combinations by comparing the set of available network,RAT combinations to a record of the last registered network,RAT combination stored in the memory 14. Since the wireless device 10 was last operated in country A outside the coverage of the network,RAT combinations available in country B, the wireless device 10 cannot register with the last registered wireless network,RAT combination, which in the assumed scenario would be PLMN 22,RAT C.

In some cases, the wireless device 10 may have previously received a preferred network,RAT combination list 15 for country B. This may, for example, have been stored in memory when the wireless device 10 was first issued, or may have been updated OTA as described above, either during a previous period of operation in country B, or as part of a preferred network,RAT combination list 15 update from the data communication service while visiting a neighbouring country. For example, in some embodiments, the preferred network,RAT combination list 15 update that the wireless device 10 received when it connected to the data communication service through RAT B of PLMN 23 may have included a preferred network,RAT combination list 15 update for both country A (MCC A) and country B (MCC B). This type of multi-country update may be preferred for neighbouring countries so that wireless devices are aware of the preferred networks in their current location as well as those in the neighbouring countries into which they may be likely to roam.

For illustrative purposes, it is assumed that the network operator of the home network of the wireless device 10 has a preferred roaming agreement with the operator of PLMN 32, but that neither PLMN 31 nor PLMN 32 are indicated as preferred in the preferred network,RAT combination list currently stored in the memory 14 of wireless device 10.

Once the network,RAT combination selector 13 determines, having regard to the preferred network,RAT combination list 15 (assumed to be as shown in Table 7A) and the registration history 16 (assumed to include blacklist 17 and registration list 18 as shown in Tables 2 and 7, respectively) stored in memory 14, that none of the wireless network,RAT combinations available in its current location in country B are preferred or blacklisted, the network selector 13 automatically selects an available wireless network,RAT combination for registration based on another suitable criteria, for example, on the respective RSSI of the available network, RAT combinations.

If it is assumed that the wireless device 10 registers with PLMN 31,RAT B based on RSSI, the wireless device 10 will attempt to register with a data communication service registration point through RAT B of PLMN 31. The data communication service registration point that the wireless device attempts to register with while in country B may be the same or different than the data communication service registration point that the wireless device attempts to register with while in country A.

In some embodiments, the wireless device 10 transmits a registration request to the data communication service registration point 70 that includes the MCC of the network,RAT combination through which the wireless device 10 is attempting to register with the data communication service registration point 70, e.g. MCC B, so that the data communication service registration point 70 is aware of the MCC of the network,RAT combination through which the wireless device 10 is attempting to register with the data communication service registration point 70. As described above, the data communication service registration point 70 provides an update to the preferred network,RAT combination list 15 stored in the memory 14 of the wireless device 10.

In some embodiments, the update to the preferred network, RAT combination list 15 may be MCC-dependent, i.e., based on the MCC of the network,RAT through which the wireless device 10 registers with the data communication service registration point 70.

If the attempt to register with the data communication service registration point 70 through PLMN 31,RAT B is successful, the wireless device 10 updates the registration list 18 to reflect this. Table 9 shows an example of how the registration list 18 shown in Table 8 might be updated to include PLMN 31,RAT B.

TABLE 9

| Registration List | | |
|---|---|---|
| MCC | MNC | RAT |
| MCC B | PLMN 31 | RAT B |
| MCC A | PLMN 22 | RAT C |
| MCC A | PLMN 23 | RAT B |

Assuming that the update to the wireless device 10 received an MCC-dependent update to its preferred network,RAT combination list 15 after registering with the data communication service registration point 70 through PLMN 31,RAT B, and that the update indicated that that PLMN 32,RAT C is the preferred network,RAT combination in country B, in some embodiments the network,RAT combination selector 13 then attempts to register with PLMN 32,RAT C after determining that PLMN 31,RAT B, with which the wireless device 10 is currently registered, is not the preferred network, RAT combination in country B based on the updated preferred network,RAT combination list 15. Table 10 is an example of how the preferred network,RAT combination list shown in Table 7A may be updated after the wireless device receives the update to the preferred network,RAT combination list 15.

TABLE 10

| Preferred Network, RAT Combination List | | | |
|---|---|---|---|
| Preference | MCC | MNC | Preferred RAT |
| 1 | MCC A | PLMN 22 | RAT C |
| 2 | MCC A | PLMN 23 | RAT B |
| 3 | MCC A | PLMN 23 | RAT C |
| 1 | MCC B | PLMN 32 | RAT C |
| 2 | MCC B | PLMN 32 | RAT B |

As can be seen in Table 10, it is assumed that the update to the preferred network,RAT combination list 15 for country B (MCC B) indicates that PLMN 32, RAT C is the most preferred network,RAT combination in country B, followed by PLMN 32,RAT B. With reference to Table 7B, it should be noted that the updated preferred network,RAT combination list shown in Table 10 could potentially have been provided to the wireless device 10 while operating in Country A using region-based updating of the preferred network,RAT combination list 15. That is, had the preferred network,RAT combination list 15 been updated as shown in Table 7B while the wireless device 10 was operating in Country A, the wireless device 10 would already have been aware of the preference for PLMN 32,RAT C over PLMN 32,RAT B before relocating to Country B. This could potentially have avoided attempts to first register with less preferred network,RAT combinations in Country B.

If the attempt to register with the data communication service registration point 70 through PLMN 32,RAT C is not successful, the wireless device 10 may blacklist PLMN 32,RAT C by adding an identification of PLMN 32,RAT C to the blacklist 17. Table 11 shows an example of how the blacklist shown in Table 3 may be updated to maintain a record of a failed attempt to register with the data communication service registration point 70 through PLMN 32,RAT C.

TABLE 11

| Blacklist | | |
|---|---|---|
| MCC | MNC | RAT |
| MCC B | PLMN 32 | RAT C |

Having stored in memory 14 a record of the successful attempt to register with the data communication service registration point 70 through PLMN 31,RAT B and the unsuccessful attempt through PLMN 32,RAT C, as reflected in the update in the registration list shown in Table 9 and the update in the blacklist shown in Table 11, the network,RAT combination selector 13 may avoid attempting to register with PLMN 32,RAT C at the next event triggering registration and instead attempt to register with PLMN 32,RAT B, despite the fact that PLMN 32,RAT C may be indicated in the preferred network,RAT combination list 15 as being preferred by the wireless device's home network operator.

In some embodiments, having failed to register with the data communication service registration point 70 through PLMN 32,RAT C, the network,RAT combination selector 13 may next attempt to register with the data communication service registration point 70 through PLMN 32,RAT B having regard to the fact that the preferred network,RAT combination list 15 indicates that PLMN 32,RAT B is the next most preferred network,RAT combination in its current location in country B, as shown in Table 10. However, in some embodiments, if PLMN 31,RAT B were indicated to be of an equal preference to PLMN 32,RAT B in the preferred network,RAT combination list 15, the network,RAT combination selector would preferentially select PLMN 31,RAT B having regard to the registration list 18 shown in Table 9, which indicates that the data communication service registration point was previously successfully registered with through PLMN 31,RAT B.

In some cases it may be desirable to define different network,RAT combination preferences in different locations within a country. For example, it may be desirable to define a preference for Network X,RAT B in Berlin and a preference for Network Y,RAT C in the rest of Germany. Accordingly, in some embodiments, the preferred network,RAT combination list 15 includes an identification of preferred network,RAT combination(s) in location areas that represent a subset of the geographic region associated with an MCC. For example, in some embodiments, a LAI (location area indicator) and/or a RAI (routing area indicator) may be included in the preferred network,RAT combination list 15 to be used in conjunction with MNC (mobile network code) to allow preferred network,RAT combinations to be specified with greater geographical granularity than MNC in conjunction with MCC. For example, with reference to the specific example discussed above with reference to FIG. 1A, it may be that in some portion of country A that is associated with a first LAI (LAI_1), RAT C of PLMN 22 is preferred, while in the rest of country A, RAT B of PLMN 23 and RAT C of PLMN 23 are preferred over RAT C of PLMN 22. These preferences could be provided to the wireless device 10 when updating the preferred network,RAT combination list by including an identification of LAI in the list, for example, as shown in Table 12.

TABLE 12

Preferred Network, RAT Combination List

| Preference | MCC   | MNC     | LAI   | Preferred RAT |
|------------|-------|---------|-------|---------------|
| 1          | MCC A | PLMN 23 | LAI_2 | RAT B         |
| 2          | MCC A | PLMN 23 | LAI_2 | RAT C         |
| 3          | MCC A | PLMN 22 | LAI_2 | RAT C         |
| 1          | MCC_A | PLMN_22 | LAI_1 | RAT_C         |
| 2          | MCC A | PLMN 23 | LAI_1 | RAT B         |
| 3          | MCC A | PLMN 23 | LAI_1 | RAT C         |

In the above example, it is assumed that the rest of country A (outside of the area associated with LAI_1) is associated with a second LAI (LAI_2). More generally, a country associated with an MCC may include any number of LAIs respectively associated with a corresponding portion of the country. While a location area indicator (LAI) is used to provide further geographical granularity to the preferred network, RAT combination list shown in Table 12, more generally, any geographical indicator of which a wireless device can be made aware that is associated with an area of operation of one or more network,RAT combinations can potentially be used to define a preference for network,RAT combination(s) in that area. For example, as noted above, MNC in conjunction with LAI and/or RAI might be used in some embodiments to define more localized unique identifiers of network,RAT combinations than simply MNC in conjunction with MCC.

In the illustrated example, the registration history 16 of the wireless device 10 includes a blacklist 17 and a registration list 18 that are separate lists. However, in some embodiments, the functionality of the blacklist 17 and the registration list 18 may be implemented in a single list of network,RAT combinations through which the wireless device has previously attempted to register with the data communication service registration point, which single list also includes a blacklist identifier that indicates whether or not a network,RAT combination identified in the single list has been blacklisted.

In the illustrated example, the network,RAT combination selector 13 is implemented as software and is executed on the processor 14. However, more generally, the RAT and network selector 13 may be implemented as software, hardware, firmware, or any appropriate combination thereof. Although shown as a single component, more generally, the RAT and network selector 13 may have one or more components. The one or more components may be integrated with other components. Also, functionality of the RAT and network selector 13 might be combined with other components. For example, in alternative implementations, the RAT and network selector 13 and the multi-RAT wireless access radio 11 are combined as a single component. Other implementations are possible.

An example method of multi-RAT wireless network,RAT combination selection is described below with reference to FIG. 3.

Method of Multi-RAT Wireless Network,RAT Combination Selection

Figure 3:
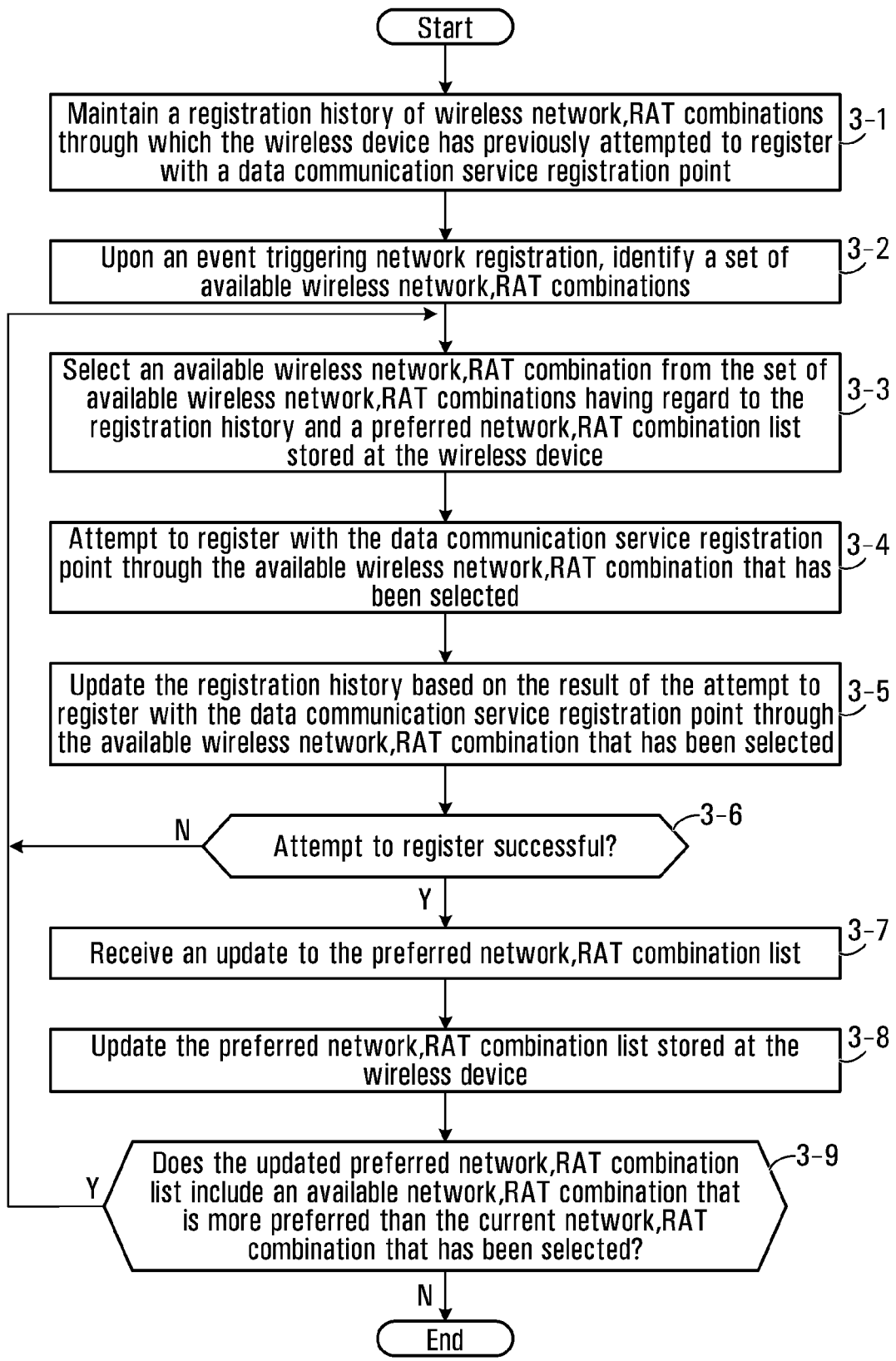
FIG. 3 is a flowchart of a method of wireless network,RAT combination selection.

Referring now to FIG. 3, shown is a flowchart of an example method of multi-RAT wireless network,RAT combination selection. This method may be implemented in a wireless device, for example by the network,RAT combination selector 13 of the wireless device 10 shown in FIG. 1B. Alternatively, this method may be implemented in any appropriately configured wireless device.

The execution of the method starts at step 3-1 in which a registration history of wireless network,RAT combinations through which the wireless device has previously attempted to register with a data communication service registration point is maintained.

Upon an event triggering registration, which might for example be when the wireless device is powered on, or when the wireless device loses coverage, at step 3-2 the wireless device identifies a set of available wireless network,RAT combinations.

At step 3-3, the wireless device selects an available network,RAT combination from the set of available wireless network,RAT combinations having regard to the registration history and a preferred network,RAT combination list stored at the wireless device.

In some embodiments, the registration history includes a blacklist of wireless network,RAT combinations through which the wireless device has previously failed in registering with the data communication service registration point. At step 3-3, the wireless device may avoid selecting an available network,RAT combination that is included on its blacklist. In some embodiments, the wireless device may attempt to register with an available network,RAT combination that has been blacklisted if the preferred network,RAT combination list has been updated subsequent its inclusion in the blacklist.

In some embodiments, the registration history includes a registration list of wireless network,RAT combinations through which the wireless device has previously successfully registered with the data communication service registration point. At step 3-3, the wireless device having regard to its preferred network,RAT combination list and its registration list may preferentially select an available network,RAT combination that is included on both the preferred network, RAT list and the registration list.

In some cases, the preferred network,RAT combination list may include two or more network,RAT combinations that have the same preference/priority level. In this case, if two such network,RAT combinations were identified by the wireless device at step 3-2 (or between steps 3-8 and 3-9 as described below), and there is no indication in the registration history that one of the two network,RAT combinations would be more likely to successfully provide a connection to the data communication service registration point for registration therewith, then at step 3-3 the wireless device might select between the two available network,RAT combinations of the highest preference/priority level based on an additional suitable criteria, such as RSSI.

At step 3-4, the wireless device attempts to register with the data communication service registration point through the wireless network,RAT combination that has been selected.

At step 3-5, the registration history is updated based on the result of the attempt to register with the data communication service registration point through the wireless network,RAT combination that has been selected.

In some embodiments, if the registration attempt was unsuccessful, the available network,RAT combination that has been selected is added to the blacklist. In addition to adding the network,RAT combination to the blacklist, any entry in the registration list identifying the network,RAT combination may be removed. In this way, a record of a previous success in registering with the data communication registration point through a particular network,RAT combination is removed from the registration list if a later attempt through the particular network,RAT combination fails. Similarly, an earlier failure recorded in the blacklist for a particular network,RAT combination may be removed if later success in registering with the data communication service registration point is achieved.

At step 3-6, if the registration attempt was unsuccessful, then the method returns to step 3-3, so that the wireless device can select another wireless network,RAT combination from the set of available wireless network,RAT combinations now having regard to the registration history that was updated at step 3-5 and the preferred network,RAT combination list.

At step 3-6, if the registration attempt was successful, then the method proceeds to step 3-7, in which the wireless device receives an update to the preferred network,RAT combination list stored at the wireless device. In some embodiments, this update is communicated from the data communication service registration point to the wireless device via the wireless network,RAT combination through which the wireless device registered with the data communication service registration point.

In some embodiments, the update to the preferred network, RAT combination list is MCC-dependent and is provided based on the MCC of the network,RAT combination through which the wireless device registered with the data communication service registration point.

In some embodiments, the update to the preferred network, RAT combination list is region-dependent and is provided based on the region in which the network,RAT combination through which the wireless device has registered with the data communication service registration point is located. In these embodiments, a region may be defined by two or more MCCs, such that a wireless device that registers with the data communication service registration point through a network,RAT having an MCC that is part of a region will receive an update to its preferred network,RAT combination list that includes the preferred network,RAT combination(s) having MCCs that are part of the region.

The OTA transmission of the update of the preferred network,RAT combination list to the wireless device may be implemented using any suitable protocol. Examples of potential protocols that might be used include, but are not limited to, an eXtensible Markup Language (XML) representation of a preferred network,RAT combination list or portion thereof over HyperText Transfer Protocol (HTTP), e.g., an XML representation of a preference table such as that shown in any one of the tables shown above over HTTP, or a Type-Length-Value (TLV) sent over User Datagram Protocol (UDP).

At step 3-7, the wireless device updates its preferred network,RAT combination list based on the update received at step 3-6.

In some embodiments, after having updated its preferred network,RAT combination list at step 3-8, the wireless device may remain registered with the network,RAT combination through which it successfully registered with the data communication service registration point until another event triggering network registration occurs, at which point network, RAT combination selection may begin again.

Alternatively, in some embodiments, after having updated its preferred network,RAT combination list at step 3-8, the wireless device determines at step 3-9 whether the updated preferred network,RAT combination list indicates that one or more of the available network,RAT combinations from the set of available network,RAT combinations identified in step 3-2, is more preferred than the available network,RAT combination through which the wireless device is currently registered with the data communication service registration point.

In some embodiments, between steps 3-8 and 3-9 the wireless device again identifies available wireless network,RAT combinations to update the set of available wireless network, RAT combinations identified at step 3-2. This can be advantageous if a wireless network,RAT combination has become available, or if a previously available wireless network,RAT combination has become unavailable, between steps 3-2 and 3-8.

If, at step 3-9 it is determined that the set of available network,RAT combinations includes an available network, RAT combination that is more preferred than the currently selected network,RAT combination, then the method returns to step 3-3. In this way, the wireless device is prompted to automatically attempt to register with the most preferred network,RAT combination that it has not currently blacklisted whenever the wireless device receives an update to the preferred network,RAT combination list, which means that not only can changes in the preferred network,RAT combination list be propagated to a wireless device on its next registration with the data communication service, but the wireless device also immediately begins network,RAT combination selection based on the updated list. Furthermore, bandwidth requirements associated with transmitting updated network,RAT combination lists to the wireless device can potentially be limited by providing MCC-dependent or region-dependent updates, such that updated preferences for network,RAT combinations having a particular MCC are propagated to the wireless device the next time the wireless device registers with a network,RAT combination having the particular MCC.

In some embodiments, if all of the available network,RAT combinations have been blacklisted, the wireless device attempts to register on the best available network,RAT combination based on radio conditions, such as RSSI, and will function without data service until the user moves. Once the wireless device encounters new MNCs, i.e., once the available network,RAT combination list includes at least one new entry, the wireless device attempts to register with the data communication service registration point on the "new" available network,RAT combination(s).

In some cases, certain network,RAT combination rejection causes may indicate that the lack of service, e.g. the inability to provide a connection to register with the data communication service registration point, is temporary. In some embodiments, if a connectivity failure, either to a network,RAT combination or to the data communication service registration point therethrough, is indicated to be temporary, then the network,RAT combination is not added to the blacklist.

If at step 3-9 it is determined that the set of available network,RAT combinations does not include an available network,RAT combination that is more preferred than the currently selected network,RAT combination or if all of the more preferred available network,RAT combinations have been blacklisted, then the wireless device remains registered with the currently selected wireless network,RAT combination until an event triggering network registration occurs and network,RAT combination selection is repeated.

In some cases, a wireless device may successfully register with a network,RAT combination but fail to be able to register with the data communication registration point through the network,RAT combination or may successfully register with the data communication service registration point but then subsequently lose that connection. In some embodiments, if failure cause codes associated with either the failed registration attempt or the lost connection indicate that the failure may be temporary, then the wireless device may retry on the same network,RAT combination. However, if the failure cause codes indicate that the failure may be indefinite or permanent, then the wireless device may blacklist the network,RAT combination and retry with a different network, RAT combination having regard to the registration history and the preferred network,RAT combination list.

In some embodiments, the registration history, which in some embodiments includes a blacklist and/or a registration list, is maintained while the wireless device remains in operation in a geographical location designated by the MCC of the last registered network,RAT combination. For example, with reference to FIG. 1A, if the wireless device 10 fails to connect to the data communication service through RAT C of PLMN 32 while in country B (designated by MCC B), then the wireless device may "blacklist" RAT C of PLMN 32, such that it avoids registering with RAT C of PLMN 32 while continuing to operate in a geographical location covered by networks having MCC B.

In some embodiments, the blacklist of network,RAT combinations for a particular MCC may be cleared or ignored at step 3-3 if the wireless device determines that the MCC of the last registered network,RAT combination is different than the MCCs of the available network,RAT combinations identified at step 3-2. Effectively, this would "reset" the blacklist for a particular country (MCC) when the wireless device registers with a network,RAT combination having a different MCC.

In some embodiments, the blacklist may only be "automatically" reset when the preferred network,RAT combination list is updated. In a cross-border scenario where the wireless device moves from a network,RAT combination having a first MCC to a network,RAT combination having a second MCC, the preferred network,RAT combination list may not be updated when the wireless device registers with the data communication service registration point through the second network,RAT combination if, for example, the wireless device already has the most up-to-date version of the preferred network,RAT combination list for the second MCC. Accordingly, under such a scenario, in some embodiments the blacklist stored on the wireless device would not be reset when the wireless device registers with the second network, RAT combination even though the second network,RAT combination has a different MCC than the first network,RAT combination with which the wireless device was previously registered.

Another Wireless Device

Figure 4:
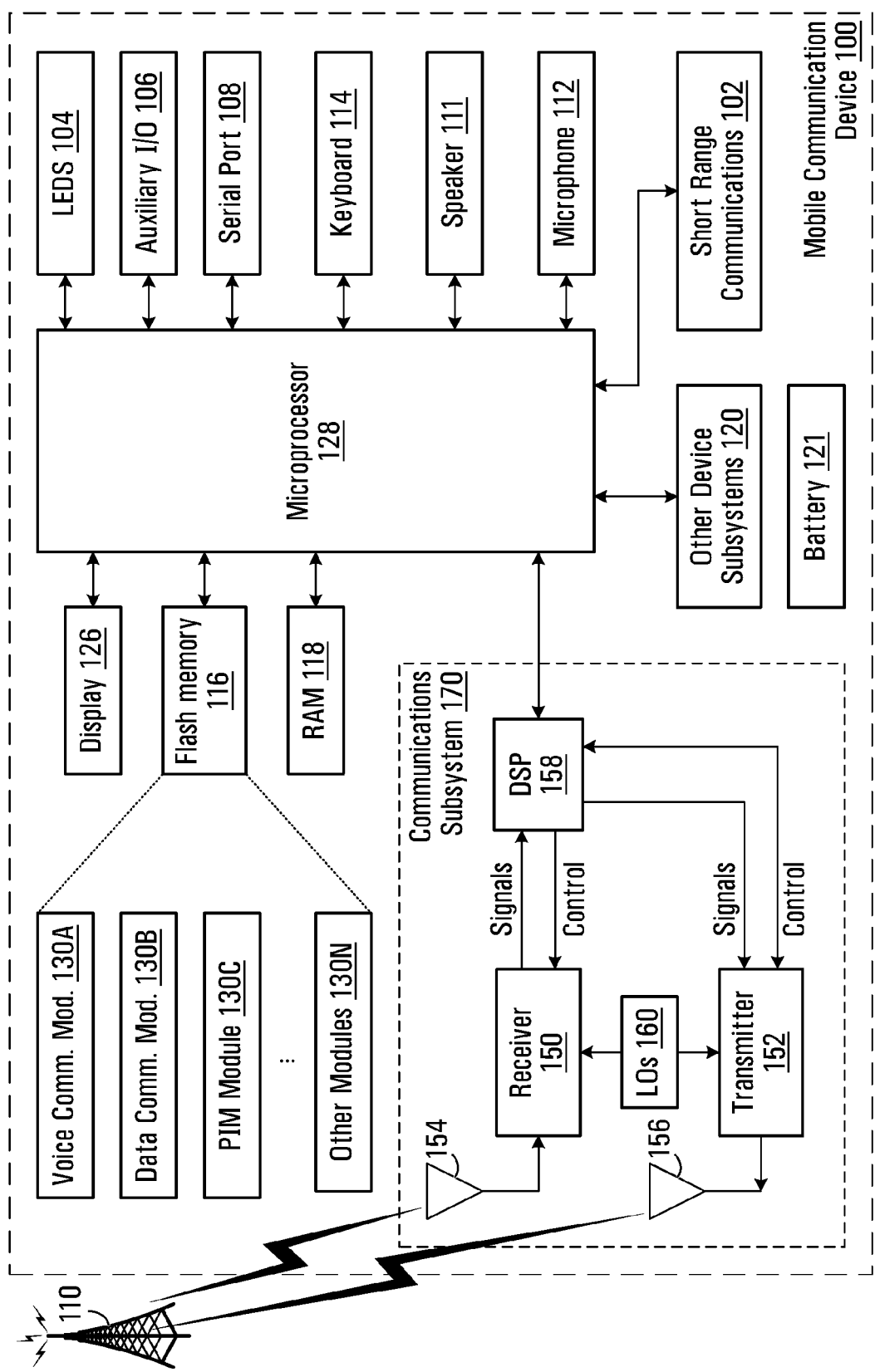
FIG. 4 is a block diagram of another wireless device.

Referring now to FIG. 4, shown is a block diagram of another wireless device 100 that may implement any of the wireless device methods described herein. The wireless device 100 is shown with specific components for implementing features similar to those of the wireless device 10 of FIG. 1B. It is to be understood that the wireless device 100 is shown with very specific details for exemplary purposes only.

A processing device (a microprocessor 128) is shown schematically as coupled between a keyboard 114 and a display 126. The microprocessor 128 is a type of processor with features similar to those of the processor 14 of the wireless device 10 shown in FIG. 1B. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the network,RAT combination selector 13 of the wireless device 10 shown in FIG. 1B. The flash memory 116 also stores a preferred network,RAT combination list and a registration history similar to those stored in the memory 14 shown in FIG. 1B. In some embodiments, the registration history stored in the flash memory 116 includes a blacklist and a registration list similar to those shown in FIG. 1B. In some embodiments, the registration history, which may include a blacklist and a registration list, may be stored in 118, since the registration history is typically less important to persist. In a specific implementation, the other module 130N of the flash memory 116 stores computer executable instructions that when executed implement a notification initiator. Note that the implementations described with reference to FIG. 4 are very specific for exemplary purposes.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the multi-RAT wireless access radio 11 of the wireless device 10 shown in FIG. 1B. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device.

The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present disclosure are possible in light of the above teachings. It is therefore to be understood that within the scope of the appended claims, the disclosure may be practised otherwise than as specifically described herein.

The invention claimed is:

1. A method for execution in a multi-RAT (multi-Radio Access Technology) capable wireless device, the method comprising:
   registering with a data communication service registration point;
   receiving an update to a preferred network,RAT combination list stored at the wireless device, the update having been sent to the wireless device responsive to the wireless device registering with the data communication service registration point; and
   upon an event triggering network registration, selecting an available wireless network,RAT combination from a set of available wireless network,RAT combinations having regard to the preferred network,RAT combination list.

2. The method of claim 1, wherein selecting an available wireless network,RAT combination from a set of available wireless network,RAT combinations is performed having regard to the preferred network,RAT combination list and a registration history of wireless network,RAT combinations through which the wireless device has previously attempted to register with the data communication service registration point.

3. The method of claim 2, further comprising:
   attempting to register with the data communication service registration point through the available wireless network,RAT combination that has been selected; and
   updating the registration history based on the attempt to register with the data communication service registration point through the available wireless network,RAT combination that has been selected.

4. The method of claim 3, further comprising:
   if the attempt to register with the data communication service registration point through the available wireless network,RAT combination that has been selected is unsuccessful, selecting an available wireless network,RAT combination from the set of available wireless network,RAT combinations having regard to the preferred network,RAT combination list and the updated registration history.

5. The method of claim 2, further comprising maintaining the registration history by:
- maintaining an identification of network,RAT combinations through which the wireless device has previously attempted and failed to register with the data communication service registration point; and
- maintaining an identification of network,RAT combinations through which the wireless device has previously attempted and succeeded in registering with the data communication service registration point.

6. The method of claim 5, wherein:
- maintaining an identification of network,RAT combinations through which the wireless device has previously attempted and failed to register with the data communication service registration point comprises maintaining a blacklist identifying such network,RAT combinations; and
- maintaining an identification of network,RAT combinations through which the wireless device has previously attempted and succeeded in registering with the data communication service registration point comprises maintaining a registration list identifying such network,RAT combinations.

7. The method of claim 6, wherein selecting an available wireless network,RAT combination comprises at least one of:
- avoiding selecting an available wireless network,RAT combination that is included in the blacklist; and
- preferentially selecting an available wireless network,RAT combination that is included in both the preferred network,RAT combination list and the registration list.

8. The method of claim 2, wherein:
- the preferred network,RAT combination list stored at the wireless device identifies preferred wireless network,RAT combinations by MCC (Mobile Country Code), MNC (Mobile Network Code), RAT type and at least one of a LAI (Location Area Indicator) and a RAI (Routing Area Indicator); and
- the registration history identifies wireless network,RAT combinations by MCC (Mobile Country Code), MNC (Mobile Network Code) and RAT type.

9. The method of claim 1, wherein:
- receiving an update to the preferred network,RAT combination list stored at the wireless device comprises receiving a MCC-dependent (Mobile Country Code-dependent) update to the preferred network,RAT combination list that is dependent on a MCC of the network,RAT combination through which the mobile device registered with the data communication service registration point; and
- the MCC-dependent update identifies preferred wireless network,RAT combinations having the same MCC as the network,RAT combination through which the mobile device registered with the data communication service registration point.

10. The method of claim 9, wherein the MCC-dependent update further identifies at least one preferred wireless network,RAT combination having a different MCC than the MCC of the wireless network,RAT combination through which the mobile device registered with the data communication service registration point, wherein the MCC of the network,RAT combination through which the mobile device registered with the data communication service registration point and the at least one different MCC are associated with a defined region.

11. The method of claim 1, wherein:
- the update to the preferred network,RAT combination list is included as part of a registration response from the data communication service registration point; and
- receiving the update comprises receiving the registration response.

12. A computer readable medium having computer executable instructions stored thereon for execution on a wireless device so as to implement the method of claim 1.

13. A multi-RAT (multi-Radio Access Technology) capable wireless device comprising:
- at least one antenna;
- a memory for storing a preferred network,RAT combination list;
- a multi-RAT capable wireless access radio functionally connected to the at least one antenna;
- a network,RAT combination selector that:
  - registers the wireless device with a data communication service registration point;
  - receives an update to the preferred network,RAT combination list, the update having been sent to the wireless device responsive to the wireless device registering with the data communication service registration point; and
  - upon an event triggering network registration, selects an available wireless network,RAT combination from a set of available wireless network,RAT combinations having regard to the preferred network,RAT combination list.

14. The wireless device of claim 13, wherein the memory is configured to store a registration history of wireless network,RAT combinations through which the wireless device has previously attempted to register with the data communication service registration point, and the network,RAT combination selector is further configured to, upon an event triggering network registration, select an available wireless network,RAT combination from a set of available wireless network,RAT combinations having regard to the registration history and the preferred network,RAT combination list.

15. The wireless device of claim 14, wherein the network,RAT combination selector is configured to:
- attempt to register the wireless device with the data communication service registration point through the available wireless network,RAT combination that has been selected; and
- update the registration history based on the attempt to register with the data communication service registration point through the available wireless network,RAT combination that has been selected.

16. The wireless device of claim 15, wherein if the attempt to register with the data communication service registration point through the available wireless network,RAT combination that has been selected is unsuccessful, the network,RAT combination selector selects an available wireless network,RAT combination from the set of available wireless network,RAT combinations having regard to the preferred network,RAT combination list and the updated registration history.

17. The wireless device of claim 14, wherein the registration history comprises at least one of:
- a blacklist of network,RAT combinations through which the wireless device has previously attempted and failed to register with the data communication service registration point; and
- a registration list of network,RAT combinations through which the wireless device has previously attempted and succeeded in registering with the data communication service registration point.

18. The wireless device of claim 17, wherein the network,RAT combination selector is configured to at least one of:
- avoid selecting an available wireless network,RAT combination from the set of available wireless network,RAT combinations that is included in the blacklist; and
- preferentially select an available wireless network,RAT combination from the set of available wireless network,RAT combinations that is included in both the preferred network,RAT combination list and the registration list.

19. The wireless device of claim 14, wherein:
- the preferred network,RAT combination list stored at the wireless device identifies preferred wireless network,RAT combinations by MCC (Mobile Country Code), MNC (Mobile Network Code), RAT type and at least one of a LAI (Location Area Indicator) and a RAI (Routing Area Indicator); and
- the registration history identifies wireless network,RAT combinations by MCC (Mobile Country Code), MNC (Mobile Network Code) and RAT type.

20. The wireless device of claim 13, wherein:
- the network,RAT combination selector attempts to register with the data communication service registration point by generating a registration request that identifies a MCC (Mobile Country Code) of the wireless network,RAT combination that has been selected.

\* \* \* \* \*